(12) United States Patent
Tian

(10) Patent No.: US 6,890,593 B2
(45) Date of Patent: *May 10, 2005

(54) METHOD OF COATING MICROMETER SIZED INORGANIC PARTICLES

(75) Inventor: Yongchi Tian, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/418,387

(22) Filed: Apr. 18, 2003

(65) Prior Publication Data

US 2003/0198738 A1 Oct. 23, 2003

Related U.S. Application Data

(63) Continuation-in-part of application No. 09/416,914, filed on Oct. 13, 1999, now Pat. No. 6,811,813.
(60) Provisional application No. 60/134,918, filed on May 19, 1999.

(51) Int. Cl.$^7$ ............................................. B05D 3/02
(52) U.S. Cl. .................... 427/215; 427/180; 427/189; 427/190; 427/193; 427/212; 427/218; 427/219; 427/64; 427/71
(58) Field of Search .......................... 427/212, 213, 427/214, 215, 216, 217, 218, 219, 180, 185, 189, 190, 191, 192, 193, 202, 203, 204, 205, 64, 65, 66, 67, 68, 71, 73

(56) References Cited

U.S. PATENT DOCUMENTS

| | | | |
|---|---|---|---|
| 3,617,332 A | 11/1971 | Lehmann | 117/33.5 C |
| 3,668,142 A * | 6/1972 | Luckey | 252/301.5 |
| 3,793,055 A | 2/1974 | Shodai et al. | 117/47 R |
| 4,398,119 A | 8/1983 | Dodds et al. | 313/466 |
| 4,435,219 A | 3/1984 | Greigger | 106/287.16 |
| 4,473,634 A | 9/1984 | Dodds et al. | 430/272 |
| 4,684,540 A | 8/1987 | Schulze | 427/71 |
| 4,695,478 A * | 9/1987 | Schulze et al. | 427/71 |
| 4,832,862 A | 5/1989 | Joubert et al. | 252/135 |
| 4,874,985 A | 10/1989 | Hase et al. | 313/487 |
| 5,051,277 A | 9/1991 | Sigai et al. | 427/69 |
| 5,078,919 A * | 1/1992 | Ashley et al. | 252/646 |
| 5,080,928 A | 1/1992 | Klinedinst et al. | 427/70 |
| 5,087,523 A | 2/1992 | Sigai et al. | 428/404 |
| 5,126,166 A | 6/1992 | Dutta et al. | 427/67 |
| 5,330,791 A | 7/1994 | Aihara et al. | 427/215 |
| 5,489,449 A | 2/1996 | Umeya et al. | 427/450 |
| 5,747,100 A | 5/1998 | Petersen | 427/64 |
| 5,874,135 A | 2/1999 | Yoon et al. | 427/560 |
| 5,892,476 A | 4/1999 | Gindrup et al. | 342/1 |
| 5,908,698 A | 6/1999 | Budd | 428/403 |

OTHER PUBLICATIONS

Pantano et al. "Oxynitride Thin Films from the Sol–Gel Process", Sol Gel Technology for Thin Films, Fibers, Performs, Electronics and Specialty Shapes, edited by Lisa C. Klein, Noyes Publications, pp111–138.

Perry et al Perry's Chemical Engineers' Handbook, 4th Edition, 1963, pp19–17.

Hawley's Condensed Chemical Dicitionary, Lewis, Sr. 1993 pp 1076.

* cited by examiner

Primary Examiner—Michael Cleveland
(74) Attorney, Agent, or Firm—William J. Burke

(57) ABSTRACT

A method for coating moisture sensitive inorganic particles, such as phosphors, comprising mixing the inorganic particles having a particle size of about 1 to 100 micrometers with nanometer-sized coating particles, and firing the mixture to soften or melt the nanometer-sized particles about the inorganic particles, forming a moisture impervious coating. The coated particles are washed to remove excess particles, and dried. Coated moisture sensitive phosphor particles are impervious to moisture.

20 Claims, 1 Drawing Sheet

METHOD OF COATING MICROMETER SIZED INORGANIC PARTICLES

This application is a continuation-in-part of U.S. application Ser. No. 09/416,914, filed Oct. 13, 1999, now U.S. Pat. No. 6,811,813 which application claims priority from Provisional application Ser. No. 60/134,918 filed May 19, 1999.

BACKGROUND OF THE INVENTION

Inorganic particles that are sensitive to atmospheric materials such as moisture can be coated using liquid-based or vapor phase methods. For example, binders and mineral or metallic colloids can be dispersed in liquid media and distributed over the surface of the inorganic particles to be coated. However, the coating materials must be insoluble in, and non-reactive with, the solvent used. Vapor phase coating methods, such as using fluidized bed reactors, require high temperatures and lengthy reaction times, which generally result in some surface reaction, or modification of the particles to be coated. Further, this type of equipment is complex and expensive.

Long persistence phosphors are known which, after having been struck by light from a light source, continue to emit light after the initial light source is extinguished. As an example, europium activated alkaline earth metal sulfides, such as SrS:Eu and CaS:Eu, are known that emit in the orange-red portions of the spectrum. Red-emitting phosphors having long persistence are very rare, but they are very useful, particularly for safety equipment, such as 'EXIT' signs and the like.

However, these phosphors are water sensitive, and they cannot be exposed to moisture without deleterious effects on their light emission. Thus they must be protected to prevent exposure to moisture.

Coating or encapsulating water sensitive phosphors with moisture insoluble materials has been tried. The coating particles can be mixed with the phosphor particles to be coated in a liquid medium, but both the coating material and the phosphor must be insoluble in, and non-reactive with, the liquid. In the case of phosphors, moisture sensitive phosphors cannot be immersed in solutions including any moisture.

Vapor phase coating has also been tried; for example, tetraethoxysilane or tetramethoxysilane can be passed through a fluidized bed including phosphor particles to deposit a silica layer, but this is an expensive process, and the high temperatures required can destroy the phosphor particles.

Thus it would be desirable to be able to apply a coating of an inorganic material onto inorganic particles to form a protective coating, or a coating that can modify particular surface properties, or impart a particular surface functionality to the inorganic particles.

In particular, a method of applying a water impervious coating onto phosphor particles that are sensitive to moisture, without the aid of an aqueous liquid medium, and a method that does not change the color or the strength of the phosphor emission, would be highly desirable.

SUMMARY OF THE INVENTION

The present invention is directed to a method of coating inorganic particles with a thin film of an inorganic coating material that does not require any liquid media for its application. Inorganic particles having a particle size of from 1 up to about 100 micrometers can be coated by stirring them with a sufficient amount of nanometer sized inorganic powders to completely cover the larger inorganic particles.

The coated inorganic particles are then fired at a temperature that is high enough to soften or melt the nanometer-sized coating particles surrounding the coated inorganic particles, but a temperature insufficient to change the surface properties of the larger inorganic particles to be coated. The present method does not require that any solvent be used.

DETAILED DESCRIPTION OF THE INVENTION

Figure 1:
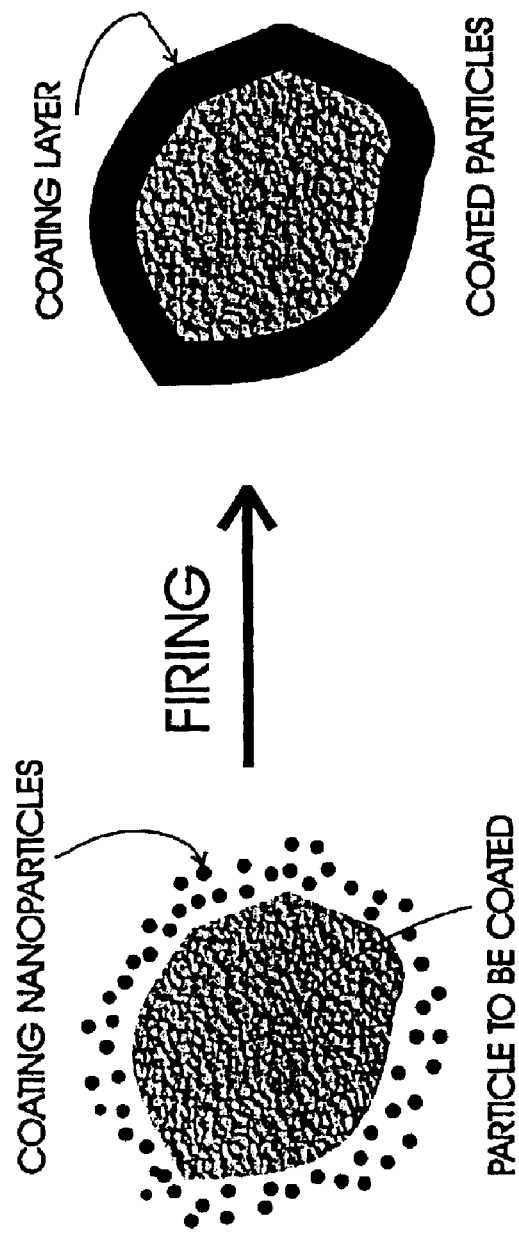
FIG. 1 illustrates the coating method of the invention.

In order for inorganic coatings to uniformly coat inorganic particles, such as phosphors, the inorganic coating particles must be much smaller than the particles to be coated. Preferably the particles to be coated are in the micrometer range, and the coating particles are in the nanometer range. Thus the coating particles are much smaller than the particles to be coated. As used herein, the phosphor or other inorganic particles to be coated has a particle size of from about 1 to about 100 micrometers. The particles can be screened or ground to obtain the desired particle size in known manner.

The inorganic coating particles, on the other hand, suitably have a particle size of from 1–2 up to about 300 nanometers. Preferably, they have a particle size of about 10 to 100 nanometers. The softening point, or melting point, of such small particles is generally lower than that of the material to be coated.

Suitable coating particles, depending on the needs for the coated product, can be of metal oxides such as alumina, zinc oxide, titania and the like, or of dielectrics such as silica or organic polymers.

In accordance with the coating method of the invention, the micrometer sized particles to be coated, and the nanometer sized particles of the coating material, are mixed together dry in a ratio that permits a uniform distribution of the coating particles about the core inorganic particles to be coated. The resultant particles are then fired so as to form a thin layer of the coating material surrounding the inorganic core particles. When the coating material is silicon for example, the firing step is carried out at a temperature of about 500–1100° C. for from about 20 minutes up to about two hours.

Since different phosphors are destroyed at different temperatures, in all cases the temperature during the firing step must be kept below the temperature at which the particular phosphor is destroyed, but above the softening or melt temperature of the coating particles. Most phosphors are destroyed at temperatures much over 1000° C. Glasses such as silica melt at temperatures below about 1000° C.

The mixing step is also important. Mixing must be conducted so as to ensure that the grains of the particles to be coated are fully surrounded with the nanometer sized coating particles, and mixing must be done so as to avoid the formation of agglomerates of the nanometer-sized coating particles and/or of the micrometer sized particles. For example, ceramic milling balls can be used during the mixing step to disperse the nanometer-sized coating particles and to ensure that they are evenly distributed in the inorganic particle volume. Ultrasonication can also be used to prevent agglomeration of the coating particles. When phosphor particles are to be coated with silica, the weight ratio of silica to phosphor can range from about 0.05 to 0.3, depending on the particle size of each type of particle.

A motor driven blender or a mechanical roller is suitable for the mixing step. Suitably, blending is carried out for at least about 20 minutes to ensure uniform coating of the inorganic micrometer-size particles.

After blending the particles, and milling to uniformly coat the inorganic micrometer-sized inorganic particles, the particles are fired at a temperature high enough so that the coating particles will soften or melt to form a thin layer on the inorganic particles, but low enough to leave the inorganic material substantially unchanged. In this regard, because of the very small size of the coating particles compared to the size of the particles to be coated, the melting point or softening point of the coating particles is desirably significantly lower than the bulk materials.

As an example for forming a silica layer on phosphor powders, firing can be carried out at a temperature of from about 500 to about 1100° C. for from about 20 to 120 minutes.

After the firing step, the coated particles are washed in a suitable solvent, including water, that will dissolve or degrade any un-coated particles remaining, leaving only water-impervious coated particles, The un-coated particles will be only a small portion of the fired particles.

Lastly, the washed coated particles are dried, as by heating in air below or near the vaporization temperature of the washing solvent used.

The invention will be further described in the following Examples, but the invention is not meant to be limited to the details described therein.

EXAMPLE 1

Fifty grams of dry SrS:Eu:Er:Dy phosphor powder that emits orange light for a few tens of minutes when excited with ultraviolet or visible light, and that has a particle size of from about 1 to about 100 micrometers, were blended with five grams of fumed silica particles having an average particle size of about 7 nanometers. Fumed silica particles having a particle size of about 2–3 to 50 nanometers are commercially available as Aerosil 30® from the DeGussa Corporation. They have a softening point of about 800° C.

The phosphor and silica particles were placed in a 200 ml cap sealed container and blended together for 30 minutes using a motor driven blender (TURBULA, a tradename of Glen Mills, Inc. of New Jersey) with the assistance of cylindrical ceramic milling balls about ½ inch by ½ inch, also placed in the container. The ceramic milling balls prevent agglomeration of the powders and particles and are readily removed from the coated inorganic particles using an appropriately sized sieve.

The blended powders were fired in a quartz tube-type furnace at 800° C. under nitrogen.

After firing, the volume of the powder mixture had shrink in size, but no sintering was apparent. The phosphor body color remained unchanged.

The coated phosphor was washed with water for ten minutes and dried at 59° C. in air for three hours.

The dried sample was immersed in water for four days. At the end of this test period, the phosphor body color remained orange and the phosphor still glowed in the dark, confirming that the phosphor particles were now coated with a moisture-impermeable layer, and were not adversely affected by the present coating method.

In comparison, a sample of the same phosphor particles which were un-coated, was also immersed in water for four days. The body color became a yellowish white, and the glow was found to fade completely within one-half hour of immersion in water.

Luminescent test results for un-coated and coated phosphor particles, before and after wetting, are given below in Table I.

TABLE 1

| | | Relative Emission Intensity | |
|---|---|---|---|
| Sample | Description | Initial | After 15 minutes |
| A | un-coated | 0.88 | 0.77 |
| B | silica coated, un-wetted | 1.00 | 0.88 |
| C | silica coated, wetted | 0.82 | 0.72 |

EXAMPLE 2

A fifty gram sample of a moisture sensitive long persistence red phosphor, $CaS:Eu^{+2}Tm^{+3}$, commercially available as "LUMILUX®" from Allied Signal, Inc, and 3 grams of Aerosil 30® were blended as in Example 1 in a 200 ml cap sealed container. This phosphor has a pink body color and emits red light for a few tens of minutes after being excited with UV/Visible light.

The blended particles were fired for 40 minutes in a tube-type furnace at 800° C. under a nitrogen purge gas. After firing, the phosphor was found to have shrunk in volume, but no sintering was visible. The body color remained unchanged. The coated phosphor was washed with water, followed by drying at room temperature in air overnight.

The dried sample was tested by immersing in water for two months. After this test, the body color remained pink and the nature of the emission was unchanged.

An un-coated control sample of the same phosphor was also immersed in water. The body color turned pinkish-red and the light emission faded away within two days of immersion in water.

EXAMPLE 3

The method of Example 2 was repeated using three silica particle sizes; Aerosil® 150; Aerosil® 200 and Aerosil® 300, having particle sizes of 150, 200 and 200 nm respectively.

Water impervious coatings were obtained for the phosphor particles for all nanometer silica particle sizes.

EXAMPLE 4

A dry phosphor powder of SrS:Eu,Er,Dy, emits orange light for a few tens of minutes after one excitation with US/V light, and is a moisture-sensitive long persistence phosphor. The phosphor was blended with fumed aluminum oxide nano-sized particles from Nanophase Technologies Corporation of Romeoville, Ill. The aluminum oxide particles have a particle size ranging from 3 to 25 nm. The phosphor and aluminum oxide particles were placed in a 200 ml cap sealed container.

Blending was carried out for ten minutes using the blender of Example 1 with the assistance of alumina milling balls in the container.

The blended powders were fired for 60 minutes in a quartz tube furnace at 800° C. under nitrogen.

After firing, the powder had shrunk in its entire volume, but no sintering was visible and the body color remained unchanged.

The coated phosphor was washed with water, and dried at 110° C. for three hours in air.

The dried sample was immersed in water for thirty days. The phosphor body remained orange and glowed in the dark in the same way as prior to the test.

Although the invention has been described in terms of particular coating materials and particular phosphors, the invention is not to be so limited. Providing the relative sizes of the particles to be coated, and the coating particles are maintained as described herein, other materials can be coated and other inorganic nanometer sized particles can be used to impart other surface properties. Thus the invention is only meant to be limited by the appended claims.

I claim:

1. A method for coating water sensitive inorganic phosphor particles comprising
   mixing the inorganic phosphor particles having a particle size of about 1 to 100 micrometers with sufficient inorganic coating particles having a particle size of about 1 to 300 nanometers to coat the inorganic particles, the coating effected without the aid of a liquid phase,
   firing the mixture at a temperature high enough to soften or melt coating particles onto the surface of the phosphor particles but low enough to avoid destroying the phosphor particles,
   removing any un-coated phosphor particles by reacting or dissolving them in a solvent, and
   drying the coated-particles.

2. A method according to claim 1 wherein the coating particles have a particle size of from about 10 to 100 nanometers.

3. A method according to claim 2 wherein said coating particles are of silica.

4. A method according to claim 2 wherein un-coated phosphor particles are removed with water.

5. A method according to claim 1 wherein inert milling balls are added to the powders during the mixing step.

6. A method according to claim 1 wherein ultrasonication is used to prevent agglomeration of the coating particles.

7. A method according to claim 1 wherein said phosphor is a europium activated strontium sulfide phosphor.

8. A method according to claim 7 wherein said coating particles are of silica.

9. A method according to claim 1 wherein said phosphor is a europium activated calcium sulfide phosphor.

10. A method according to claim 9 wherein said coating particles are of silica.

11. A method according to claim 1 wherein un-coated phosphor particles are removed with water.

12. A method according to claim 1 wherein the particles are fired at a temperature of from 500–1100° C.

13. A method according to claim 12 wherein said coating particles are of silica.

14. A method according to claim 1 wherein the coating particles are selected from the group consisting of silica, alumina, titania, and zinc oxide.

15. A method according to claim 1 wherein said coating particles are of silica.

16. A method according to claim 15 wherein the silica-:phosphor ratio by weight is from about 0.05 to 0.3.

17. A method according to claim 1 wherein said coating particles are of alumina.

18. A method according to claim 1 wherein said phosphor is a europium activated alkaline earth metal sulfide phosphor.

19. A method according to claim 18 wherein said coating particles are of silica.

20. A method according to claim 18 wherein un-coated phosphor particles are removed with water.

* * * * *